(12) United States Patent
Suzuki et al.

(10) Patent No.: US 8,507,420 B2
(45) Date of Patent: Aug. 13, 2013

(54) SOLVENT COMPOSITION

(75) Inventors: Atsushi Suzuki, Okazaki (JP); Yasushi Kawata, Tottori (JP)

(73) Assignees: Toyota Jidosha Kabushiki Kaisha, Aichi-ken (JP); National University Corporation Tottori University, Tottori (JP)

( * ) Notice: Subject to any disclaimer, the term of this patent is extended or adjusted under 35 U.S.C. 154(b) by 487 days.

(21) Appl. No.: 12/782,855

(22) Filed: May 19, 2010

(65) Prior Publication Data
US 2010/0298184 A1   Nov. 25, 2010

(30) Foreign Application Priority Data
May 21, 2009  (JP) ................. 2009-123324

(51) Int. Cl.
*C07F 13/00* (2006.01)
*B01F 1/00* (2006.01)
*C09K 5/00* (2006.01)
*C10L 1/18* (2006.01)

(52) U.S. Cl.
USPC .............. 508/382; 252/364; 252/73; 252/74; 44/451

(58) Field of Classification Search
USPC ............... 508/382; 252/364, 74, 73; 44/451
See application file for complete search history.

(56) References Cited

U.S. PATENT DOCUMENTS
5,847,034 A * 12/1998 Achenbach et al. ............ 524/91

FOREIGN PATENT DOCUMENTS
| JP | 03-50285 A1 | 3/1991 |
| JP | 03-273082 A1 | 12/1991 |
| JP | 05-179275 A | 7/1993 |
| JP | 2008-005797 A | 1/2008 |
| WO | WO9510185 A1 | 4/1995 |
| WO | WO03103680 A1 | 12/2003 |
| WO | WO2005000854 A2 | 1/2005 |

OTHER PUBLICATIONS

Vajragupta, et al., Manganese-based complexes of radical scavengers as neuroprotective agents, May 15, 2003, Department of Pharmaceutical Chemistry, Abstract.*
Partial translation of Japanese Office Action dated Sep. 13, 2011 for Japanese Patent Application No. 2009-123324.

* cited by examiner

*Primary Examiner* — Ellen McAvoy
*Assistant Examiner* — Vishal Vasisth
(74) *Attorney, Agent, or Firm* — Sughrue Mion, PLLC

(57) ABSTRACT

A solvent composition includes a substance that is subject to oxidative alteration by an oxygen radical, and a compound that has a superoxide dismutase-mimetic activity that includes oxygen radical-removing capability. In the solvent composition of the invention, oxygen radicals can be removed by the compound having an superoxide dismutase-mimetic activity that includes oxygen radical-removing capability, and therefore the substance that is subject to oxidative alteration can be prevented from oxidizing.

9 Claims, 7 Drawing Sheets

Mn-cpx3
Manganese complex of 7-hydroxylflavone

Mw : 602.3

Mn-TMPyP
Mn(III) tetrakis (1-methyl-4-pyridyl) porphyrin

Mw : 909.0

Mn-TBAP
Mn(III) tetrakis (4-benzoic acid) porphryin

Mw : 879.2

Mn-TM-2-PyP
Mn(III) meso-tetrakis (N-methyl-2-pyridyl) porphyrin Pentachloride

Mw : 909.0

FIG. 1
Mn-cpx3
Manganese complex of 7-hydroxylflavone
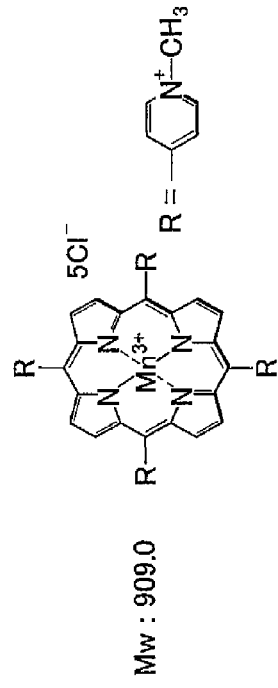
Mw : 602.3
Mn-TMPyP
Mn(III) tetrakis (1-methyl-4-pyridyl) porphyrin
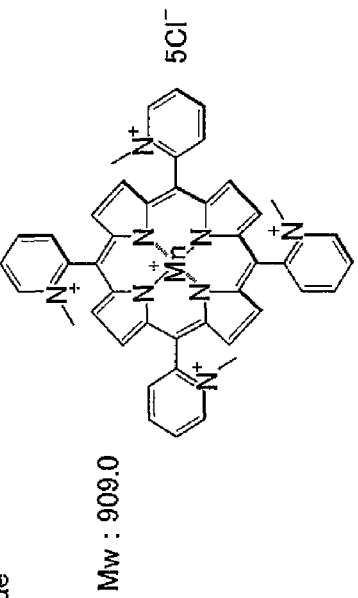
Mw : 909.0
Mn-TBAP
Mn(III) tetrakis (4-benzoic acid) porphryin
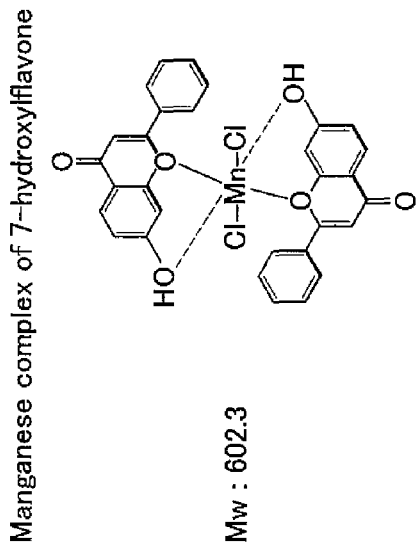
Mw : 879.2
Mn-TM-2-PyP
Mn(III) meso-tetrakis (N-methyl-2-pyridyl) porphyrin Pentachloride
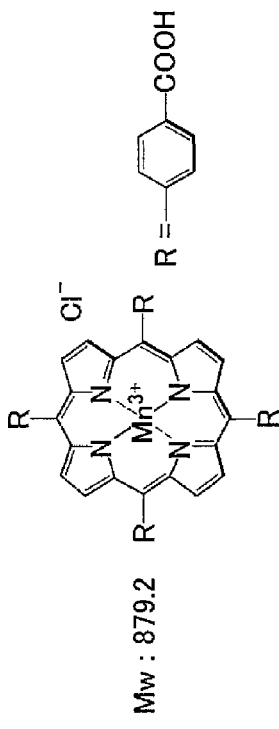
Mw : 909.0

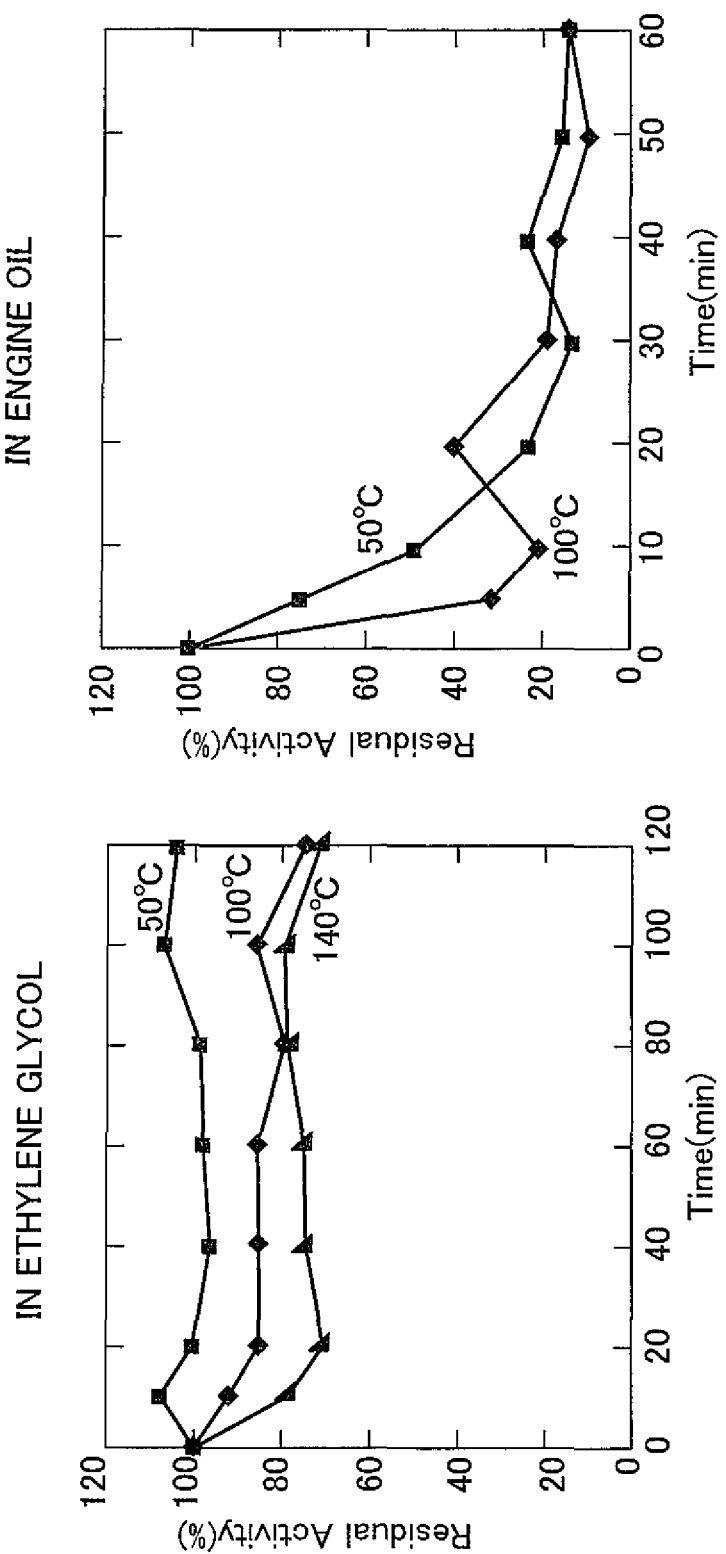
F I G. 6

SOLVENT COMPOSITION

INCORPORATION BY REFERENCE

The disclosure of Japanese Patent Application No. 2009-123324 filed on May 21, 2009, including the specification, drawings and abstract is incorporated herein by reference in its entirety.

BACKGROUND OF THE INVENTION

1. Field of Invention

The invention relates to a solvent composition that is usable as a lubricant for use for internal combustion engines and the like, or as a coolant for use for fuel cells and the like.

2. Description of Related Art

In recent years, the worldwide emission of carbon dioxide is considered to be causing global warming, and is considered to deteriorate the global environment and adversely affect the human life in the future. The emission of carbon dioxide from the combustion of motor vehicle fuel cannot be ignored. While reduction of the emission of carbon dioxide has been internationally made compulsory on the basis of the Kyoto Protocol, attention is now focused on how to restrain the emission of carbon dioxide without lowering the living standard. As the first step to that end, so-called bioethanol, that is, ethanol produced by the fermentation technology from plant-origin materials, such as corn, sugarcane, used paper, and other plant-origin wastes, has begun to be used as a mixture with a motor vehicle fuel (gasoline) or as a 100% bioethanol motor-vehicle fuel, whereby a new emission of carbon dioxide is avoided and thus the emission of carbon dioxide in the global cycle is lessened. From this time on, the use of bioethanol fuel is an important issue that cannot be evaded in the motor vehicle manufacturing industry.

By the way, various lubricating oils and solvent compositions are used in internal combustion engines of motor vehicles, drive train-system appliances, such as automatic transmissions, shock absorbers, power steering apparatuses and the like, gears, etc., in order to smooth the operation thereof. In order to prevent degradation of a solvent composition that is represented by the foregoing lubricants, fluids and the like, it is known to add an additive, such as oxidation preventative phenol-based additives, amine-based additives, etc. (Japanese Patent Application Publication No. 5-179275 (JP-A-5-179275)). That is, these additives prevent the oxidation by reacting with degraded substances that occur in the solvent composition. However, since insoluble sludge is produced as the lubricant base oil or the like is oxidized by oxygen radicals that occur in the solvent composition, the oxidation preventative agent decreases together with the reaction, and eventually loses its oxidation preventative effect. Besides, since the generation of sludge cannot be completely restrained, functional declination due to production of sludge cannot be avoided. Therefore, according to the related art, effective means for restraining the functional degradation of the solvent composition, such as a lubricating oil and the like, for a long period of time is not known.

In order to solve this problem, a utilization method for the superoxide dismutase enzyme, which is very highly stable against heat, and which is able to essentially enzymatically decompose oxygen radicals that are causative substances that cause oxidative deterioration is proposed (Japanese Patent Application Publication No. 2008-0005797 (JP-A-2008-0005797)).

However, even the solvent composition disclosed in Japanese Patent Application Publication No. 2008-0005797 (JP-A-2008-0005797) cannot easily be used at temperature of 100° C. or higher. Besides, since enzymes are essentially water soluble, the solubility of the enzymes in 100% ethanol and in lubricating oil is low, and the use of enzymes in such solvents is limited.

SUMMARY OF THE INVENTION

The invention provides a solvent composition for use as a lubricating oil, an ethanol-containing bio-fuel, etc., which is able to restrain the oxidative functional alteration and degradation caused by oxygen radicals and stably maintain the functions for a long time.

A solvent composition of an aspect of the present invention includes: a substance that is subject to oxidative alteration by an oxygen radical; and a compound that has a superoxide dismutase-mimetic activity that includes oxygen radical-removing capability. In this solvent composition, oxygen radicals can be removed by the compound that has a superoxide dismutase-mimetic activity that includes oxygen radical-removing capability, and the substance that is subject to oxidative alteration can be prevented from oxidizing.

The compound may be a complex of an aromatic compound and a metal ion, or a complex of a porphyrin compound and a metal ion. Examples of the metal ion include manganese ion. Examples of the foregoing compound include, although not limited to, at least one species of compound selected from the group consisting of a manganese complex of 7-hydroxyflavone, manganese (III) tetrakis(4-benzoic acid) porphyrin chloride, manganese (III) tetrakis(1-methyl-2-pyridyl)porphyrin, and manganese (III) meso-tetrakis(N-methyl-2-pyridyl)porphyrin pentachloride.

In the solvent compound, examples of the substance that is subject to oxidative alteration include a lubricant component and a coolant component. That is, the solvent composition of the invention can be used as a lubricant or a coolant.

In particular, this invention is applicable to all kinds of fluids, oil solutions and the like for maintaining functions of a motor vehicle when the vehicle uses bioethanol fuel, including the biofuel and lubricating oils and the like.

The invention makes it possible to prevent a solvent composition that contains a substance that is subject to oxidative alteration, from undergoing oxidative alteration, for a long period of time, for example, even under high-temperature condition. Therefore, the solvent composition in accordance with the invention can be used for a long period of time, for example, even under high-temperature condition, without reduction of its functions.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein:

FIG. 1 is a diagram showing the chemical structures and the molecular weights of the SOD mimetic compounds used in the examples of the invention;

FIG. 6 shows characteristic diagrams showing the thermal stability of Mn-cpx3 in ethylene glycol and in an engine oil.

DETAILED DESCRIPTION OF EMBODIMENTS

Figure 2:
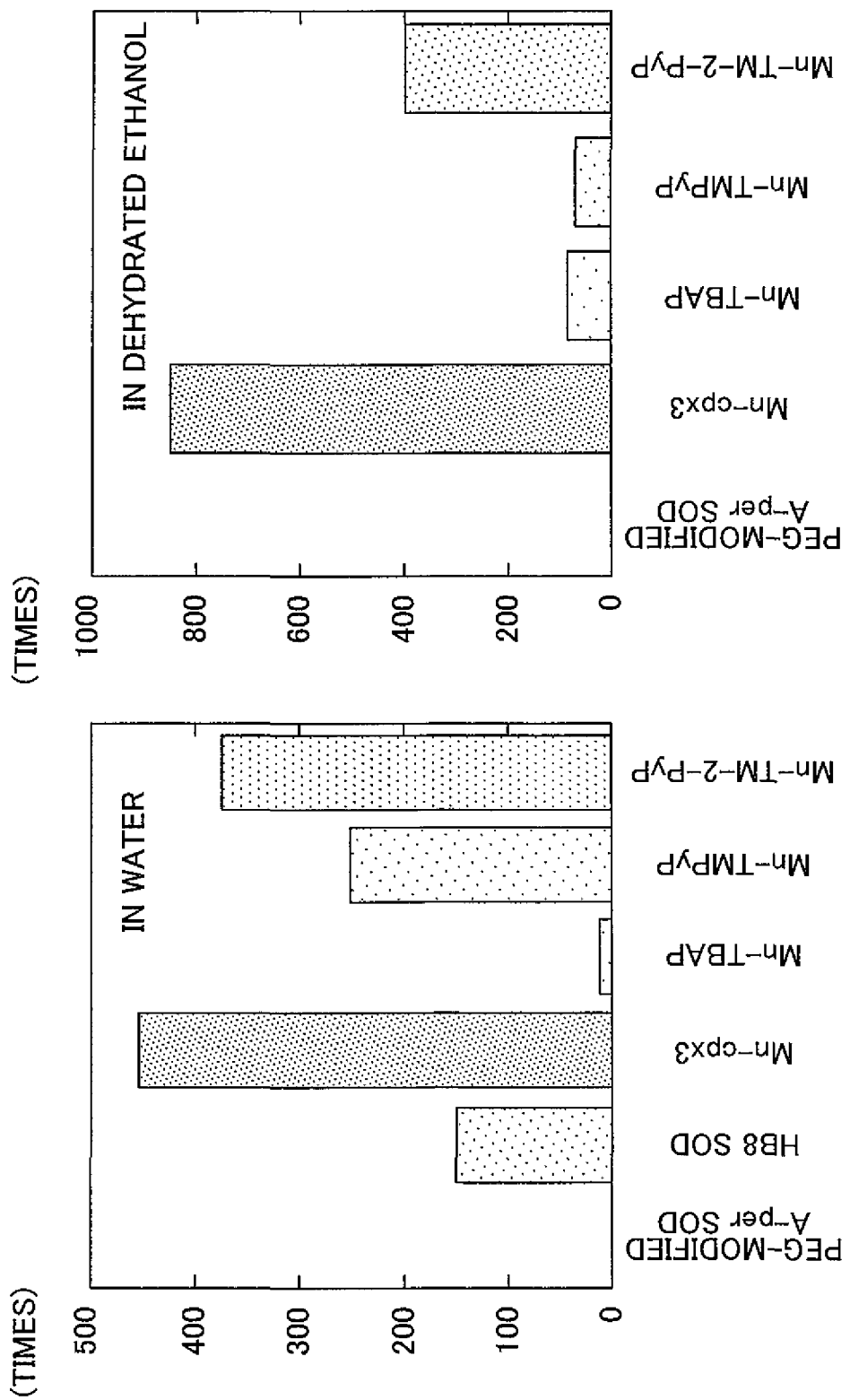
FIG. 2 shows characteristic diagrams showing results of measurement of the relative activity of four kinds of SOD mimetic compounds, that is, Mn-cpx3, Mn-TBAP, Mn-TMPyP and Mn-TM-2-PyP, in water and in dehydrated ethanol.

The invention is widely applicable to solvent compositions that contain a substance that is subject to oxidative alteration by oxygen radicals, and that are used for specific purposes. Examples of the substance that is subject to oxidative alteration by oxygen radicals include fuel components containing ethanol and, particularly, biofuel components containing bioethanol, lubricant base oil components of mineral oils and the like, water-based lubricant components of microemulsions and the like, coolant components of ethylene glycol and the like, etc. Besides these substances, examples of the foregoing substance also include phosphoric acid ester, silicone oil, and water-glycol mixture. These substances, if subject to oxidative alteration by oxygen radicals, are damaged with regard to the function as a lubricant base oil, the function as a water-based lubricant, and the function as a coolant component.

Besides, the use of the solvent composition depends on the function of the foregoing substance. That is, in the case where the foregoing substance is a lubricant base oil component of a mineral oil or the like, the solvent composition is used as a lubricating oil. In the case where the substance is a coolant component such as a ethylene glycol or the like, the solvent composition is used as a coolant. In the case where the substance is a water-based lubricant of a microemulsion or the like, the solvent composition is used as a water-based lubricant. In particular, it is preferable that the solvent composition be used as a biofuel that contains ethanol.

The solvent composition contains a compound that has a superoxide dismutase-mimetic activity that includes oxygen radical-removing capability (hereinafter, termed SOD mimetic compound), so that the SOD mimetic compound prevents accumulation of oxygen radicals. The SOD mimetic compound means a compound that catalyzes a reaction that changes oxygen radicals into hydrogen peroxide, similarly to superoxide dismutase.

In particular, it is preferable that the SOD mimetic compound have a function of catalyzing the foregoing reaction under high-temperature condition. The high-temperature condition herein means, for example, a condition of 60° C., and preferably 80° C., and more preferably 100° C., and most preferably 140° C. That is, the SOD mimetic compound is a compound that catalyzes the foregoing reaction under a condition of, for example, 60° C., and preferably 80° C., and more preferably 100° C., and most preferably 140° C.

The SOD mimetic compound is not particularly limited but may be any compound as long as the compound has a function of catalyzing the foregoing reaction. The SOD mimetic compound may be a commercially available substance or may also be a newly synthesized substance. The SOD mimetic compound may be, for example, a complex of an aromatic compound and a metal ion, or a complex of a porphyrin compound and a metal ion. Examples of the metal ion include manganese ion, iron ion and zinc ion.

Concretely, examples of the SOD mimetic compound include: a manganese (Mn) complex of 7-hydroxyflavone (termed Mn-cpx3), Mn(III) tetrakis(4-benzoic acid)porphyrin chloride (termed Mn-TBAP), Mn(III) tetrakis(1-methyl-4-pyridyl)porphyrin (termed Mn-TMPyP), and Mn(III) meso-tetrakis(N-methyl-2-pyridyl)porphyrin pentachloride (termed Mn-TM-2-PyP). These SOD mimetic compounds may be singly used, or may also be used as a mixture of two or more kinds of compounds.

For example, Mn-cpx3, one of the SOD mimetic compounds, is highly stable in a water-based ethanol, and soluble in ethylene glycol and in vegetable oil, and is able to retain substantially 100% of its activity after 120 minutes of a thermal process at 50° C., and 70% or more of its activity after 120 minutes of the thermal process at 100° C. Thus, since the thermal stability of Mn-cpx3 is very good, a solvent composition containing Mn-cpx3 as an SOD mimetic compound is able to retain its quality over a long period of time under high-temperature condition. Besides, Mn-cpx3 is a low-molecular compound, and is able to achieve sufficient effect even when contained in a very small content.

In the solvent composition, the amount of the SOD mimetic compound is not particularly limited. However, the amount of the SOD mimetic compound in the solvent composition may be, for example, 1 to 100 μg/mL, and is preferably 1 to 50 μg/mL, and more preferably 1 to 10 μg/mL. If the amount of the SOD mimetic compound is below the foregoing range, there arises a possibility of it becoming difficult to prevent the oxidation reaction by oxygen radicals. On the other hand, if the amount of the SOD mimetic compound exceeds the foregoing range, there arises possibility of resulting in an inconvenient situation in which the amount of metals (manganese, and the like) contained in a combustion exhaust gas or the like is large.

As for the configuration of the SOD mimetic compound in use, the compound may be used not only in a solvent, but may also be immobilized to a resin, metal or plastic material, or the like. As for the immobilization method for the SOD mimetic compound, it is possible to appropriately adopt, for example, any one of the methods disclosed by M. Wilchek and T. Miron, J. Biochem. Biophys. Methods 55, 67-70, 2003; S. Piletsky, E. Piletska, A. Bossi, N. Turner and A. Turner, Biotechnology and Bioengineering, 82, 86-92, 2003; and T. Haruyama, T. Sakai and K. Matsuno, Biomaterials, 26, 4944-4947, 2005.

The solvent composition constructed as described above uses the SOD mimetic compound to remove oxygen radicals (superoxides) that are a factor of degradation of substances in an oxygen atmosphere. Although there has been a related-art method in which a scavenger is added in order to remove oxygen radicals, the coexistence of the scavenger poses problems of pollution and degradation of the functional substances. On the other hand, the solvent composition of embodiments of the invention is free from the problems of the SOD mimetic compound polluting the functional substances and degrading the functions, and is therefore is able to retain high quality.

Besides, the solvent composition of the embodiment of the invention, containing the SOD mimetic compound, is able to retain the activity of removing oxygen radicals even under relatively high-temperature condition. Therefore, the invention is applicable to solvent compositions for use under high-temperature condition, for example, ethanol-mixed oil and various lubricating oils of different properties which are for use in internal combustion engines and the like.

Furthermore, according to the embodiment of the invention, the oxygen radicals that can possibly oxidatively degrade substances at high temperature can be removed or excluded in a clean manner in an ethanol-containing fuel system environment, or in various lubricating oils of different properties. According to the related art, the SOD enzyme (Japanese Patent Application Publication No. 2008-5797 (JP-A-2008-5797) is used in order to remove oxygen radicals. However, since the SOD enzyme is insoluble in oil solutions, and the use of the SOD enzyme is limited. The SOD mimetic compound, however, is soluble in water, as a matter of course, and also soluble in organic solvents and in oil solutions, and is thermally stable. Therefore, the solvent composition of the embodiments of the invention can be more widely applied.

EXAMPLES

Hereinafter, the invention will be described in detail with reference to examples. However, the technical scope of the invention is not limited by the following examples.

Example 1

1. SOD Mimetic Compound and Use Conditions

In this example, Mn-cpx3, Mn-TBAP, Mn-TMPyP and Mn-TM-2-PyP were purchased from Aldrich Company, and were used as SOD mimetic compounds. The structural formulas and the molecular weights of these compounds are shown in FIG. 1. These compounds are low-molecular complex having π-conjugate system. These compounds are basically water-soluble, and are also soluble in ethanol and in lubricating oils. In the case where an SOD mimetic compound was to be dissolved in ethylene glycol, and in a food oil containing vegetable sterol and glycerin ester as main components, the SOD mimetic compound was first dissolved in ethanol, and then the ethanol solution was added into ethylene glycol and a food oil. In the case where an SOD mimetic compound was to be dissolved in an engine oil (trade name: Eneos Motor Oil), the SOD mimetic compound was firstly dissolved in dimethyl sulfoxide (DMSO), and then the DMSO solution was added into the engine oil. As for the concentration conditions for thermal stability, investigation was performed in the presence of 1 to 10 μg/mL of an SOD mimetic compound in the water-based solution and 10 to 50 μg/mL of an SOD mimetic compound in the oil-based solution, with 10% of ethanol or DMSO, in the temperature range of 50 to 140° C.

2. Purification Method for Heat-Resistant SOD Enzyme

With regard to the *Aeropyrum pernix* strain-derived heat-resistant SOD enzyme (A. per SOD) and the *Thermus thermophillus* HB8 strain-derived heat-resistant SOD enzyme (HB8 SOD) (both of which are proteins made up of amino acids) which were used for comparison in this experiment, mass culture and enzyme purification were performed by methods substantially the same as those described in Japanese Patent Application Publication No. 2008-5797 (JP-A-2008-5797). Besides, for solubilization in organic solvents, the A. per SOD modified with polyethylene glycol was used.

3. Activity Measurement

The SOD activity of the SOD mimetic compounds was measured by using as an index the oxidation of a water-soluble tetrazolium salt (WST) by oxygen radicals generated from xanthin-xanthin oxidase. Specifically, the WST was used as a substrate of the oxidation by oxygen radicals, and the activity measurement was performed by using as an index the difference in the production of water-soluble tetrazolium formazan made by the presence and the absence of the SOD mimetic compound (see the following document: H. Ueda, D. Kawana, S. Maeda and M. Sawamura, Biosci. Biotechnol. Biochem., 63, 485-488, 1999). As the WST is oxidized to become water-soluble tetrazolium formazan, ultraviolet absorption occurs at 450 nm. Therefore, by measuring this ultraviolet absorption, the oxidation reaction by oxygen radicals can easily be measured. The activity measurement buffer was a 35 mM sodium carbonate solution (pH 10.2) containing 0.17 mM of xanthin and 0.11 mM of EDTA. The oxidation substrate used was 0.24 mM of the WST. The SOD mimetic compounds were dissolved in ethanol or DMSO. The concentrations thereof at the time of measurement of activity were 0.1 to 0.8 μg/mL.

In this activity measurement system, the WST used as the oxidation substrate can be considered to be a model compound as the substance that is subject to oxidation by oxygen radicals, that is, as the functional substance. The heat-resistant SOD prevents the oxidation of the substrate WST.

4. Comparison Between Activities of SOD Mimetic Compounds in Water and in Dehydrated Ethanol, and Thermal Stability The relative activities of the four kinds of SOD mimetic compounds, that is, Mn-cpx3, Mn-TBAP, Mn-TMPyP and Mn-TM-2-PyP, in water and in dehydrated ethanol were investigated. Results of the investigation are shown in FIG. 2. Results regarding the HB8 SOD and the PEG-modified A. per SOD, which are heat-resistant enzymes in water, are shown as well. In dehydrated ethanol, only the PEG-modified A. per SOD was used for comparison. In either case, the relative activities per unit weight are shown with reference to the enzyme activity of the PEG-modified A. per SOD. As compared with the enzymes, which are high-molecular compounds, shows that the SOD mimetic compounds, which are low-molecular compounds, all exhibited comparatively quite high activity. In particular, Mn-cpx3 exhibited an activity 460 times as high as the activity of the PEG-modified A. per SOD, and an activity 850 times as high as the activity thereof even after the process in ethanol was performed at 50° C. for 10 minutes.

Figure 3:
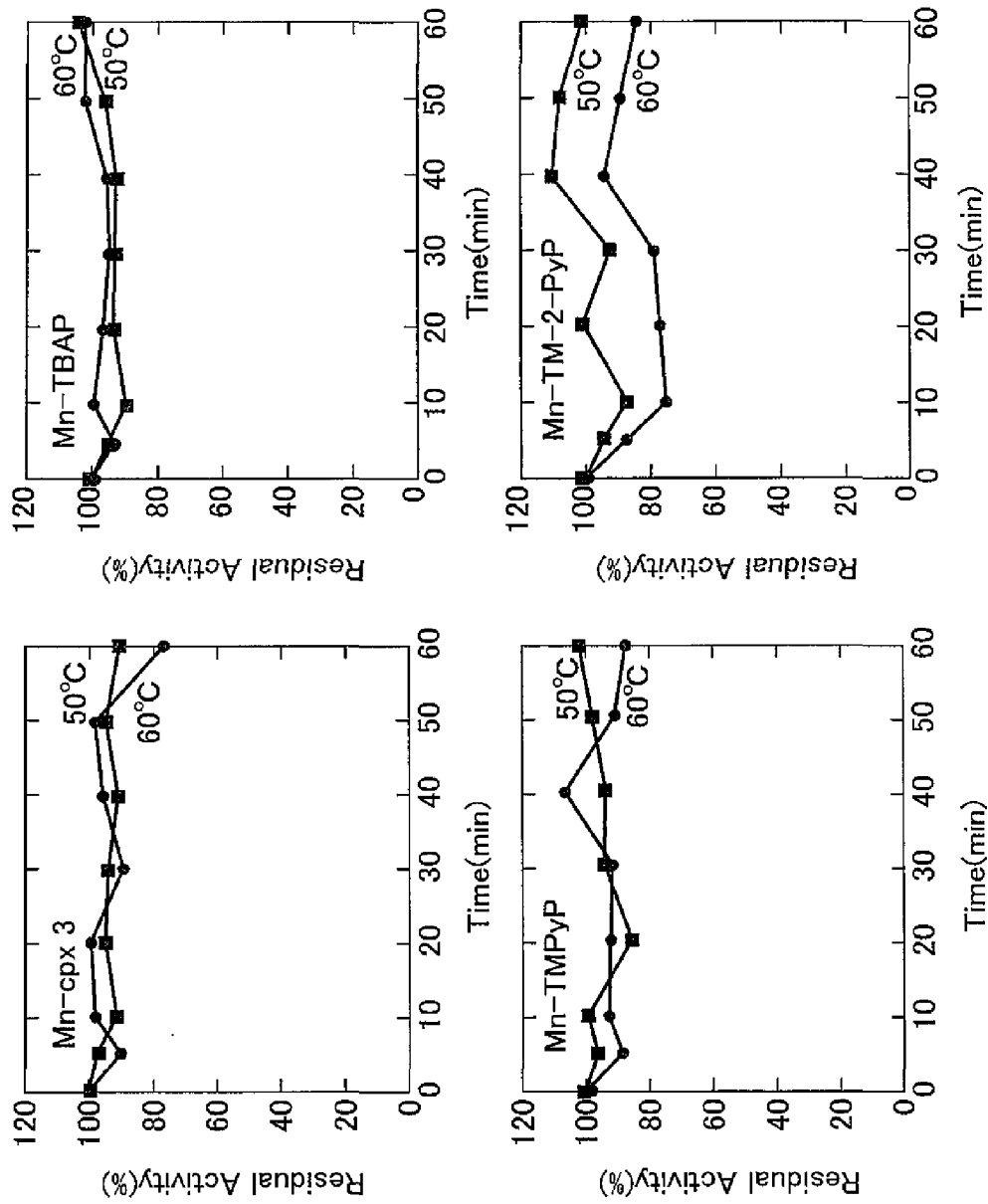
FIG. 3 shows characteristic diagrams showing time-dependent charges in the thermal stability of four species of SOD mimetic compounds, that is, Mn-cpx3, Mn-TBAP, Mn-TMPyP and Mn-TM-2-PyP, in water at 50° C. and 60° C.
Figure 4:
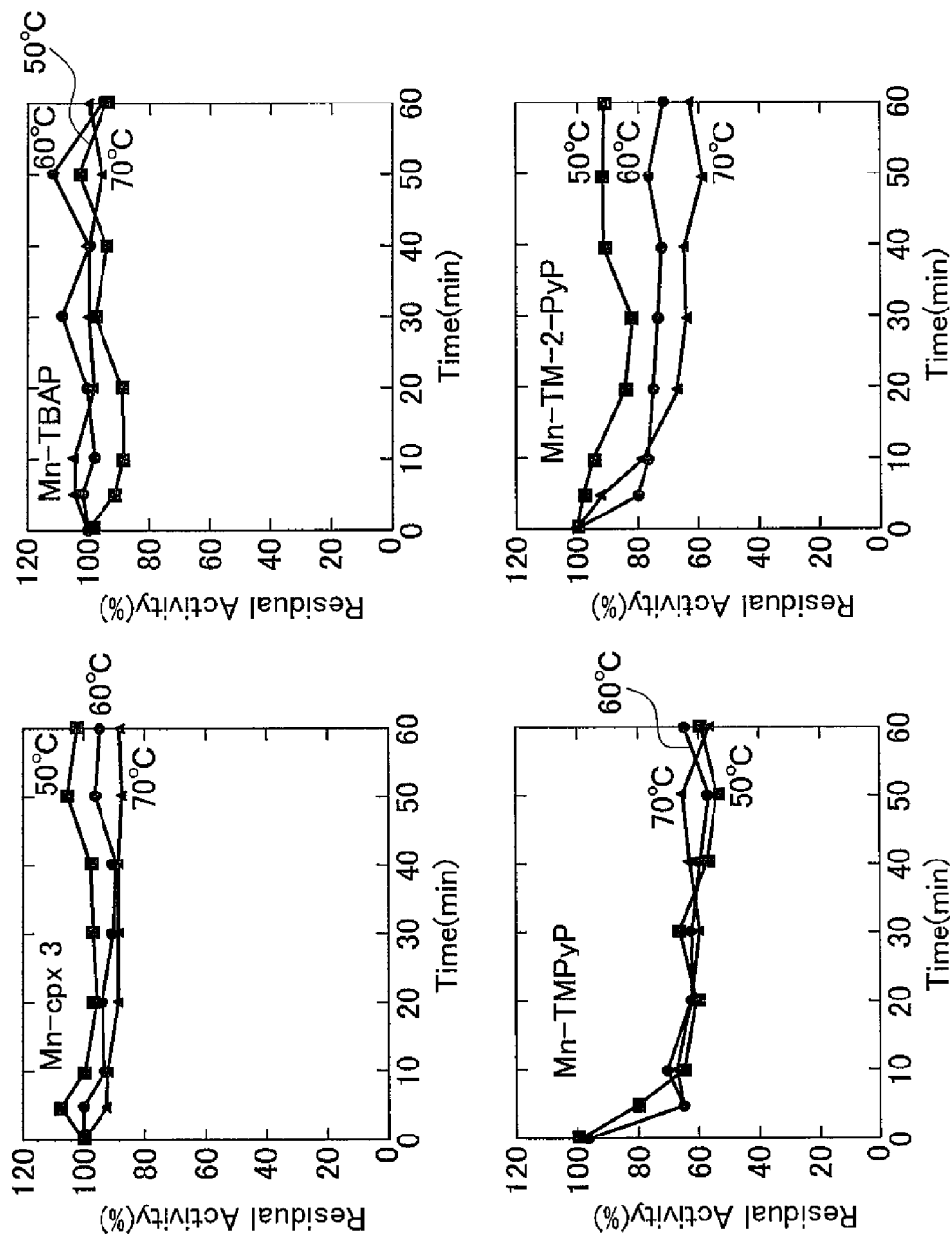
FIG. 4 shows characteristic diagrams showing time-dependent charges in the thermal stability of four species of SOD mimetic compounds, that is, Mn-cpx3, Mn-TBAP, Mn-TMPyP and Mn-TM-2-PyP, in dehydrated ethanol at 50° C. and 60° C.

The in-water thermal stability of the SOD mimetic compounds, which exhibited comparatively high SOD activity in terms of weight ratio, was investigated. FIG. 3 shows time-dependent changes in the thermal stability of the four SOD mimetic compounds in water at 50° C. and 60° C. Each compound exhibited high stability. Furthermore, results regarding the thermal stability thereof in dehydrated ethanol are shown in FIG. 4. In particular, it has become clear that Mn-cpx3 and Mn-TBAP do not exhibit substantially no decline in the activity even after 60 minutes of the thermal process at 70° C., even in dehydrated ethanol.

5. Thermal Stability of SOD Mimetic Compounds in Vegetable Food Oil

Figure 5:
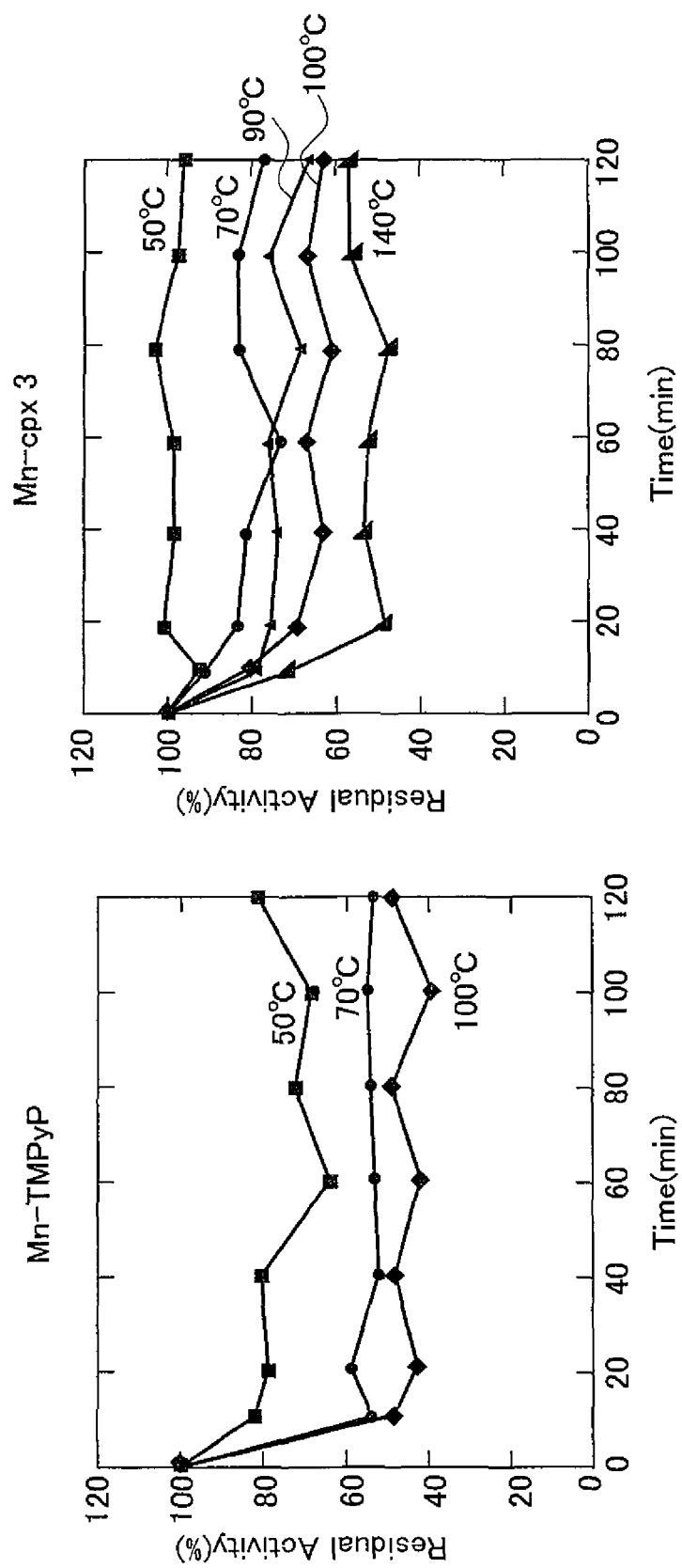
FIG. 5 shows characteristic diagrams showing the thermal stability of Mn-TMPyP and Mn-cpx3 in a vegetable food oil.

With regard to Mn-TMPyP and Mn-cpx3, which exhibited the highest stability in dehydrated ethanol, the thermal stability in vegetable food oil was investigated. In this example, the vegetable food oil used was diacyl glycerol. Results of the investigation are shown in FIG. 5. Mn-TMPyP retained 50% of the activity at 70° C. after 120 minutes, and 40% of the activity at 100° C. after 120 minutes. On the other hand, Mn-cpx3 was found to retain 60% of the activity at 100° C. after 120 minutes, and 50% of the activity at 140° C. after 120 minutes of the process. It has become clear that Mn-cpx3 is particularly excellent in the SOD-mimetic activity and the thermal stability in food oil.

6. Thermal Stability of Mn-cpx3 in Various Oil Solutions

With regard to Mn-cpx3, which was considered to be the most excellent in activity and thermal stability, the stability thereof in other oil solutions was investigated. FIG. 6 shows results of the experiment in ethylene glycol and in engine oil are shown. Even in ethylene glycol, Mn-cpx3 exhibited a good stability of 70% activity after 120 minutes of the thermal process at 140° C. However, in engine oil, the stability sharply declines to about 10 to 20%.

Figure 7:
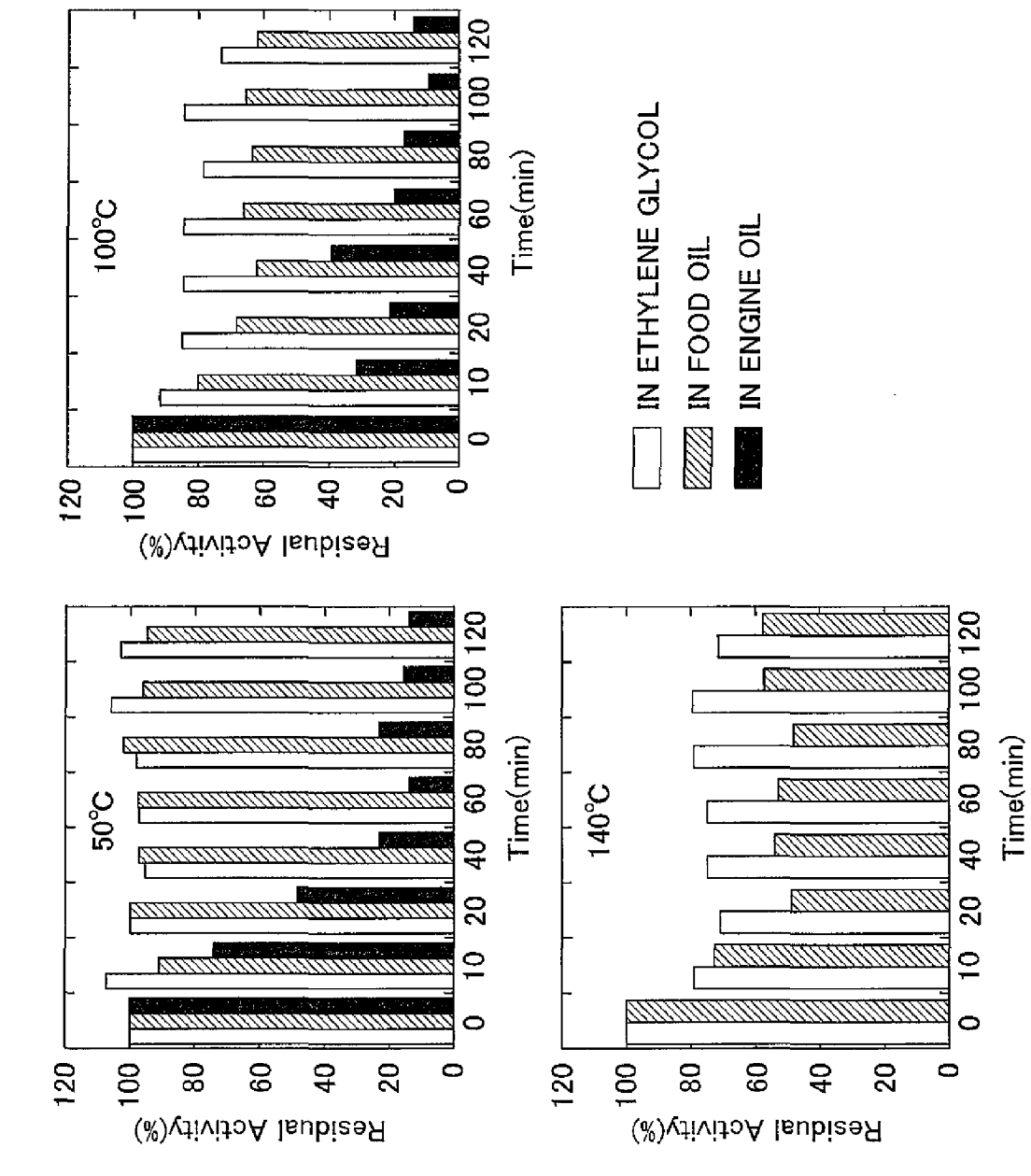
FIG. 7 shows characteristic diagrams showing a summary of the results shown in FIGS. 5 and 6.

A summary of the thermal stabilities of Mn-cpx3 in ethylene glycol, in vegetable food oil, and in engine oil, at 50° C., 100° C. and 140° C., is shown in FIG. 7. Thus, it has become clear that Mn-cpx3, a compound that exhibits SOD-mimetic activity, is soluble even in oil solutions, and has considerably high thermal stability. A noble understanding of the compound as a solvent additive that prevents the damage of the functional substance by oxygen radicals and that can provide long service life has been made clear for the first time.

What is claimed is:

1. A solvent composition including: a substance that is subject to oxidative alteration by an oxygen radical; and a manganese complex of 7-hydroxyflavone, wherein the substance is one of a fuel component that contains ethanol, a biofuel component that contains bioethanol, a lubricant base oil component of a mineral oil, a water-based lubricant component of a microemulsion, a coolant component of ethylene glycol, a phosphoric acid ester, silicone oil, and water-glycol mixture.

2. The solvent composition according to claim 1, wherein concentration of the compound in the solvent composition is 1 to 100 μg/mL.

3. The solvent composition according to claim 2, wherein concentration of the compound in the solvent composition is 1 to 50 μg/mL.

4. The solvent composition according to claim 3, wherein concentration of the compound in the solvent composition is 1 to 10 μg/mL.

5. A lubricant including the solvent composition according to claim 1.

6. A coolant including the solvent composition according to claim 1.

7. A solvent composition including: a substance that is subject to oxidative alteration by an oxygen radical, a manganese complex of 7-hydroxyflavone, and a water-based solvent.

8. The solvent composition according to claim 7, wherein the water-based solvent contains ethylene glycol.

9. A solvent composition including: a substance that is subject to oxidative alteration by an oxygen radical, and a manganese complex of 7-hydroxyflavone, wherein the substance is a lubricant component or a coolant component.

* * * * *